United States Patent [19]

Answine et al.

[11] Patent Number: 5,735,555
[45] Date of Patent: Apr. 7, 1998

[54] FUEL RAIL TO FUEL TUBE END COMPACT CONNECTOR

[75] Inventors: Todd Matthew Answine, Newport News; Anthony Louis Franchitto, Hampton; Gary Douglas Vattelana, Prince George, all of Va.

[73] Assignee: Siemens Automotive Corporation, Auburn Hills, Mich.

[21] Appl. No.: 768,521

[22] Filed: Dec. 18, 1996

[51] Int. Cl.⁶ .................................................... F16L 39/00
[52] U.S. Cl. .................... 285/319; 285/348; 285/921
[58] Field of Search ................................. 285/319, 921, 285/233, 348

[56] References Cited

U.S. PATENT DOCUMENTS

| | | | |
|---|---|---|---|
| 2,497,441 | 2/1950 | Detweiler | 285/233 |
| 3,986,730 | 10/1976 | Martelli et al. | 285/348 X |
| 4,781,400 | 11/1988 | Cunningham | 285/319 X |
| 5,090,748 | 2/1992 | Masayoshi et al. | 285/319 |
| 5,303,963 | 4/1994 | McNaughton et al. | 285/319 |
| 5,527,072 | 6/1996 | Norkey | 285/319 |
| 5,609,370 | 3/1997 | Szabo et al. | 285/319 |

*Primary Examiner*—Dave W. Arola
*Attorney, Agent, or Firm*—Russel C. Wells

[57] ABSTRACT

A connector assembly for connecting a fuel rail and an inlet tube having an inlet tube end and a raised annular flange a predetermined distance from its end includes a connector body and an annular clip. The connector body is attached to the fuel rail and includes an outwardly extending shoulder. The annular clip has a periphery with a generally U-shaped cross section including an inner leg and outer leg. The inner leg is inclined inwardly for engaging the inlet tube annular flange and the outer leg includes a resilient locking portion biased inwardly for withdrawal restraining engagement with the connector body outwardly extending shoulder. The annular clip is mountable on the inlet tube beyond the raised annular flange. The inlet tube is telescopingly received in the connector body and axially engaged as the locking portion of the annular clip is urged into engagement with the connector body outwardly extending shoulder.

1 Claim, 2 Drawing Sheets

FUEL RAIL TO FUEL TUBE END COMPACT CONNECTOR

FIELD OF THE INVENTION

This invention relates to fuel rails for internal combustion engines and more particularly to a connector assembly for connecting together a fuel rail and fuel inlet or outlet tube.

BACKGROUND OF THE INVENTION

It is known in the art relating to fuel rail and fuel tube connections to provide a large mass of material at the end of the rail to provide strength for retaining a clip that effects the connection with the fuel tube. Other, compact, designs utilize a stuffer pin to insert connection parts such an O-ring, spacer and/or clip which are subsequently used to effect the connection.

Such connections require removal of the stuffer pin, which is then thrown away, and insertion of an end of the fuel tube to effect the connection.

SUMMARY OF THE INVENTION

The present invention provides a connector assembly of compact construction that eliminates the requirement of a stuffer pin and simplifies assembly of fuel rail and fuel tube connection.

More specifically, the connector assembly connects a fuel rail and an inlet tube having an inlet tube end. The inlet tube has a raised annular flange a predetermined distance from its end.

A connector body attached to the fuel rail includes a through bore and a counterbored open end. The counterbored open end and the through bore meet to define an annular shoulder in the connector body. The counterbored open end is sized to receive the inlet tube end and annular flange. The connector body open end has an outwardly extending shoulder.

A spacer ring is mountable on the inlet tube between the raised annular flange and the tube end. The spacer ring abuts the annular shoulder in an assembled condition of the inlet tube with the connector body. An annular seal is mountable around the inlet tube between the raised annular flange and the spacer ring for sealing the connection of the connector body and inlet tube against fuel leakage.

An annular clip having a periphery with a generally U-shaped cross section is mountable on the inlet tube beyond the raised annular flange. The annular clip has an inner leg and an outer leg. The inner leg is inclined inwardly for engaging the inlet tube annular flange and the outer leg includes resilient locking means biased inwardly for sliding and snapping into withdrawal restraining engagement with the connector body outwardly extending shoulder. The inlet tube is telescopingly received in the connector body and axially retained as the locking means of the annular clip snaps into engagement with the connector body outwardly extending shoulder.

In one embodiment, the connector body is integral with the fuel rail and made of a plastic material. The annular clip may be made of plastic material or metal. Either the plastic or metallic annular clip may include a plurality of spaced adjacent outer legs in a peripheral disposition. Although the locking means of the metallic clip may comprise an inwardly extending return bend, other locking means such as inwardly blanked detents or tangs may be utilized. Preferably the annular seal is an O-ring.

These and other features and advantages of the invention will be more fully understood from the following detailed description of the invention taken together with the accompanying drawings.

DETAILED DESCRIPTION OF THE INVENTION

Figure 1:
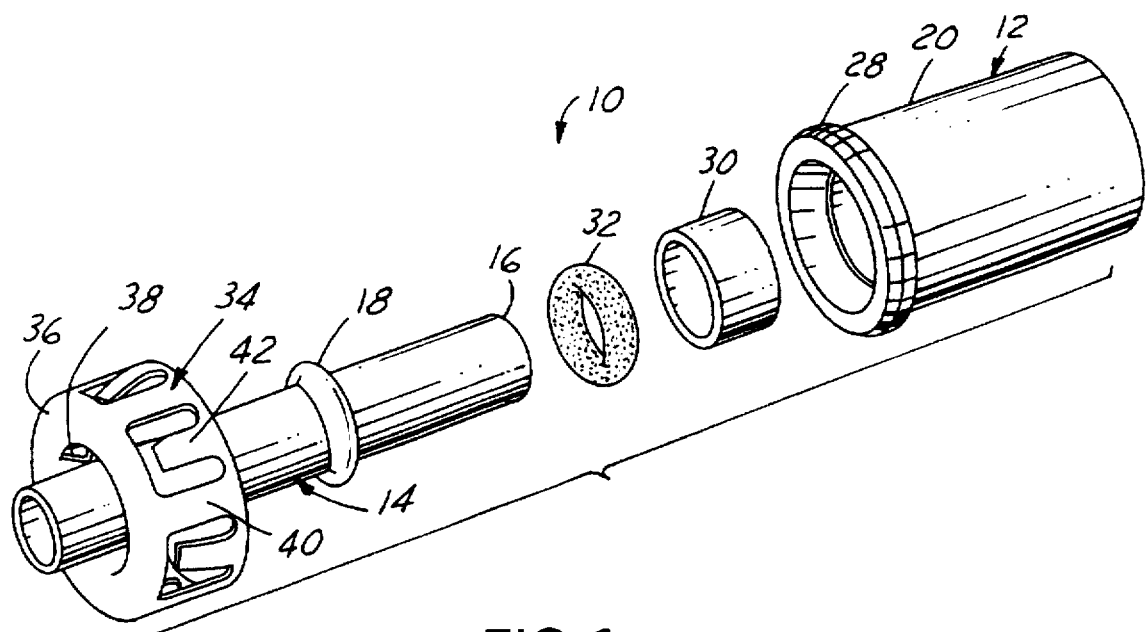
FIG. 1 is an exploded perspective view of a connector assembly constructed in accordance with the present invention.

With reference to FIGS. 1 through 4 of the drawings, a compact connector assembly in accordance with the present invention is generally indicated by reference numeral 10 and is used for connecting together a fuel rail 12 and a fuel tube, herein inlet tube 14, having an inlet tube end 16. As is hereinafter more fully described, the connector assembly 10 provides a simplified compact connection which is easily connected without special tools.

Figure 2:
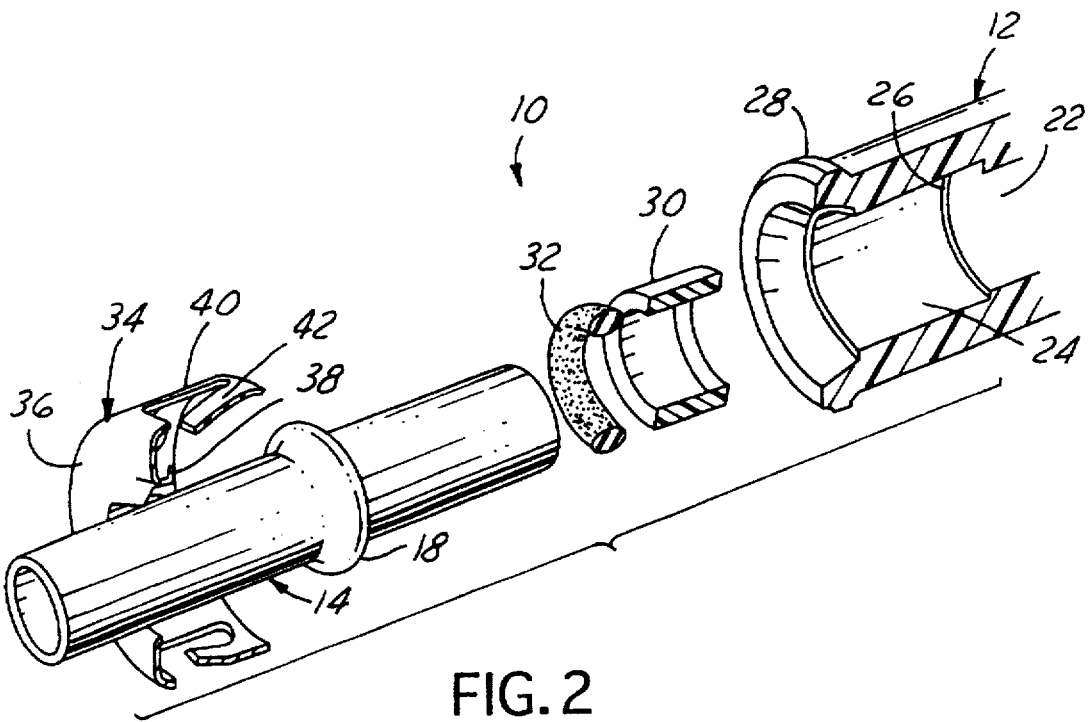
FIG. 2 is an exploded perspective sectional view of the connector assembly of FIG. 1.
Figure 3:
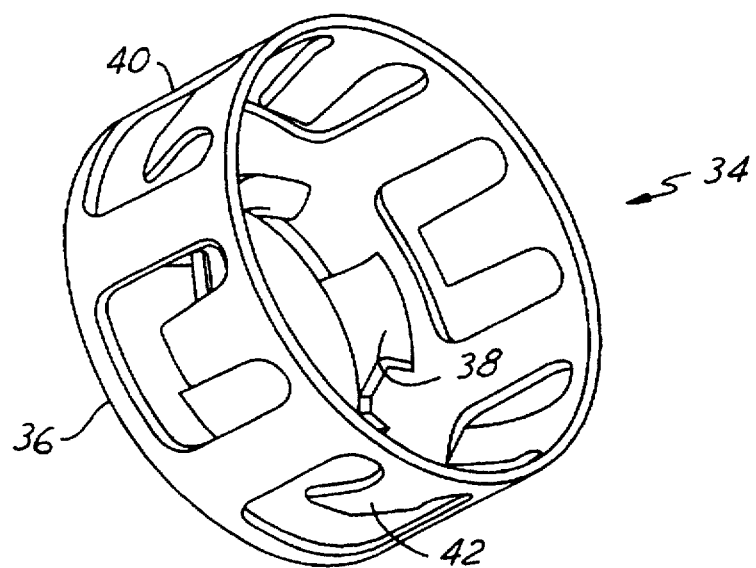
FIG. 3 is a perspective view of an annular clip of the invention.

As illustrated in FIGS. 1, 2 and 3, the inlet tube 14 includes a raised annular flange 18 a predetermined distance from its end 16. The connector assembly 10 comprises a connector body 20 attached to the fuel rail 12. Preferably the connector body 20 is integral with the fuel rail 12 and of a plastic material. The connector body 20 has a through bore 22 and a counterbored open end 24 that meet to define an annular shoulder 26 in the connector body. The counterbored open end 24 is sized in diameter and length to receive the inlet tube end 16 and annular flange 18. The connector body open end 24 includes an outwardly extending shoulder 28.

A spacer ring 30 is mountable on the inlet tube 14 between the raised annular flange 18 and tube end 16. The spacer ring 30 abuts the annular shoulder 26 when the inlet tube 14 is mounted in the connector body 20 as shown in FIG. 2.

An annular seal 32, illustrated as a conventional O-ring, is mountable around the inlet tube end 16 between the raised annular flange 18 and the spacer ring 30. Annular seal 32 seals the connection of the connector body 20 and inlet tube 14 against fuel leakage in the assembly illustrated in FIG. 2.

An annular clip 34 has a periphery 36 with a generally U-shaped cross section. Annular clip 34 is mountable on the inlet tube 14 beyond the raised annular flange 18. Annular clip 34 can be of metal or plastic construction and includes an inner ring or leg 38 and an outer ring or leg 40. The inner leg 38 is inclined inwardly for engaging the inlet tube annular flange 18 and the outer leg 40 includes resilient locking means 42 biased inwardly for sliding over and snapping into withdrawal restraining engagement with the connector body outwardly extending shoulder 28.

As illustrated in FIG. 3, annular clip 34 includes a plurality of spaced circumferentially adjacent inwardly extending tangs 42 formed in the outer ring 40.

Figure 4:
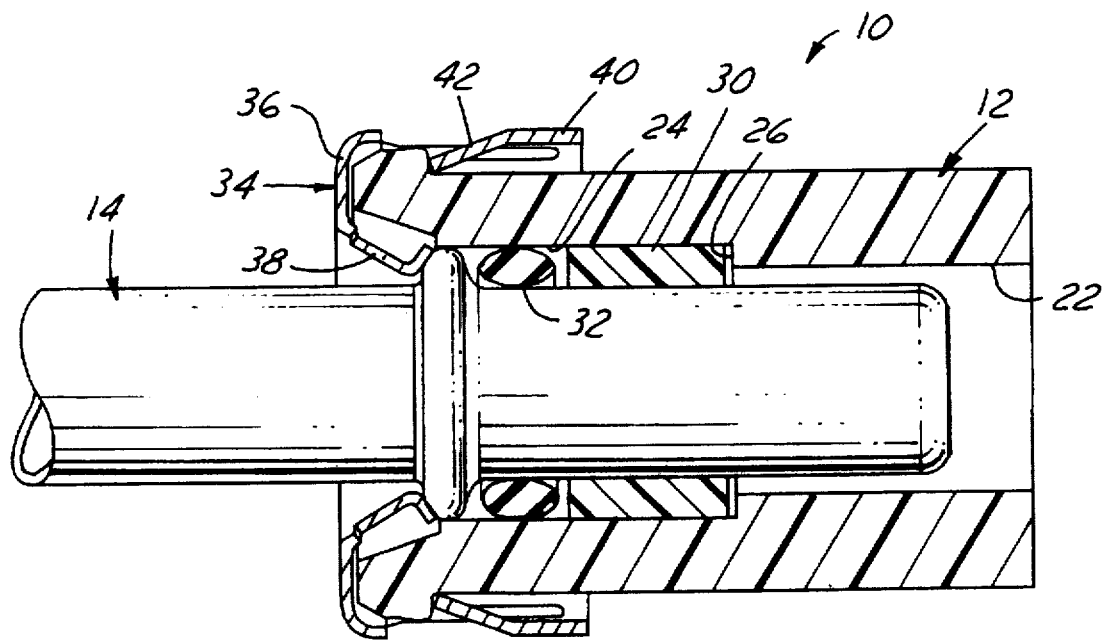
FIG. 4 is a sectional view of the connector of FIG. 1 in an assembled condition.

With reference to FIG. 4, the assembly of the fuel rail 12 and an inlet tube 14 is effected by telescopingly receiving the inlet tube end 16 in the connector body 20 and urging the inner leg of the annular clip 34 against the tube annular flange 18. Upon sufficient relative axial displacement of the clip 34, the locking means 42 snaps into engagement with the connector body outwardly extending shoulder 28. The connector assembly 10 then comprises a compact package and uses only one O-ring 32, one spacer ring 30 and an annular clip 34.

The compactness of the connector assembly 10 is accomplished by using the circumferencial or annular clip 34 which is put onto the inlet tube end 16 past the annular flange 18 before the fuel tube 14 is inserted into the connector body 20. The annular clip 34 provides the locking once it is pushed over the outwardly extending shoulder 28 of the connector body 20.

The spacer ring 30 provides backup for the O-ring 32 and support for the end 16 of the fuel tube 14. The spacer ring 30 also allows the fuel rail 12, in the integral embodiment with the connector body 20, to be molded with a larger internal diameter along its entire length, because it takes up the extra space between the fuel tube 14 and the rail wall. Such construction achieves flow distribution requirements and molding processing ease. The O-ring 32 and spacer ring 30 are installed onto the tube end 16 before inserting it into the connector body 20, providing for simplified assembly as a stuffer pin is not required before the connection is effected.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A connector assembly for connecting a fuel rail and an inlet tube having an inlet tube end, the inlet tube having a raised annular flange a predetermined distance upstream from its end, the connector assembly comprising:

a connector body attached to the fuel rail, said connector body having a through bore and counterbored open end wherein said counterbored open end and through bore meet to define an annular shoulder in said connector body;

said counterbored open end being sized to receive the inlet tube end and annular flange, said connector body open end having an outwardly extending shoulder, wherein the improvement comprises:

a spacer ring mountable on the inlet tube between the raised annular flange and tube end, said spacer ring abutting said annular shoulder in a mounted position of the inlet tube in said connector body;

an annular seal mountable around the inlet tube end between the raised annular flange and said spacer ring for sealing the connection of said connector body and inlet tube against fuel leakage;

an annular clip having a periphery with a generally U-shaped cross section and having a plurality of circumferentially spaced inner legs and a plurality of circumferentially spaced adjacent outer legs joined together at one end thereof by said U-shaped cross section and the other end of said outer legs by means of a circumferential ring, said inner legs being inclined inwardly for resiliently engaging the inlet tube annular flange, said outer legs including resilient locking means biased inwardly from said circumferential ring for sliding over and snapping into withdrawal restraining engagement with said connector body outwardly extending shoulder, said annular clip being mountable on the inlet tube axially upstream from the raised annular flange, whereby the inlet tube is telescopingly received in said connector body and axially restrained from withdrawal as said locking means is urged into engagement with said connector body outwardly extending shoulder.

* * * * *